US010427858B2

(12) United States Patent
Mackintosh et al.

(10) Patent No.: US 10,427,858 B2
(45) Date of Patent: Oct. 1, 2019

(54) INSULATED BOTTLE HOLDER

(71) Applicants: Ian Frank Mackintosh, Columbia, SC (US); Celia Beth Mackintosh, Columbia, SC (US)

(72) Inventors: Ian Frank Mackintosh, Columbia, SC (US); Celia Beth Mackintosh, Columbia, SC (US)

( * ) Notice: Subject to any disclaimer, the term of this patent is extended or adjusted under 35 U.S.C. 154(b) by 0 days.

(21) Appl. No.: 15/317,439

(22) PCT Filed: Jun. 9, 2015

(86) PCT No.: PCT/US2015/034882
§ 371 (c)(1),
(2) Date: Dec. 9, 2016

(87) PCT Pub. No.: WO2015/191566
PCT Pub. Date: Dec. 17, 2015

(65) Prior Publication Data
US 2017/0137207 A1 May 18, 2017

Related U.S. Application Data

(60) Provisional application No. 62/009,624, filed on Jun. 9, 2014.

(51) Int. Cl.
*B65D 23/08* (2006.01)
*B65D 81/38* (2006.01)
(Continued)

(52) U.S. Cl.
CPC ..... *B65D 81/3881* (2013.01); *A47G 23/0241* (2013.01); *B65D 41/0442* (2013.01);
(Continued)

(58) Field of Classification Search
CPC .... A47G 2023/0291; A47G 2023/0275; A47G 2023/0283; A47G 23/0241; A47G 23/04;
(Continued)

(56) References Cited

U.S. PATENT DOCUMENTS 81,814 A * 9/1868 Nuellens ............... F25D 31/007
62/297
1,999,670 A * 4/1935 Strouse ..................... F25D 3/14
220/592.16
(Continued)

OTHER PUBLICATIONS

International Search Report and Written Opinion dated Aug. 25, 2015 in corresponding international application No. PCT/US2015/034882, all enclosed pages cited.
(Continued)

*Primary Examiner* — J. Gregory Pickett
*Assistant Examiner* — Gideon R Weinerth
(74) *Attorney, Agent, or Firm* — Nelson Mullins Riley & Scarborough, LLP

(57) ABSTRACT

A bottle holder for various size bottles that is designed to keep the bottle and liquid cool, enable the user to pour from the bottle while the bottle is in the holder, and protect the bottle from breaking in case of accident. The bottle holder includes a body, comprised of an outer shell and an inner shell, as well as a lid that may be attached to the body such as by screwing it on or by friction. The outer shell preferably has one or more features that enable the user to maintain a better grip. The inner shell and lid have different features to hold the bottle securely. Advantageously, the body and lid provides thermal protection.

22 Claims, 19 Drawing Sheets

(51) Int. Cl.
  *F25D 3/08* (2006.01)
  *A47G 23/02* (2006.01)
  *A47G 19/22* (2006.01)
  *B65D 41/04* (2006.01)
  *A47J 41/00* (2006.01)

(52) U.S. Cl.
  CPC ....... *A47G 2023/0283* (2013.01); *A47J 41/00* (2013.01); *B65D 81/3876* (2013.01); *F25D 2331/803* (2013.01)

(58) Field of Classification Search
  CPC ............ A47G 23/0225; A47G 19/2288; B65D 81/3876; B65D 81/3888; B65D 81/3881; B65D 41/0442; B65D 23/0885; B65D 81/3879; F25D 2331/803; F25D 31/007; B60N 3/10; A47J 41/00; A47J 41/006; Y10S 220/903
  USPC .......... 220/739, 902, 903, 592.24, 626, 737, 220/592.16; 215/386, 395, 396, 12.1, 215/232; 62/457.3, 457.4, 457.8, 530, 62/372
  See application file for complete search history.

(56) References Cited

U.S. PATENT DOCUMENTS

| | | | |
|---|---|---|---|
| 2,599,767 A | | 6/1952 | Long |
| 3,755,030 A | | 8/1973 | Doman et al. |
| 4,299,100 A | | 11/1981 | Crisman et al. |
| 4,549,410 A | * | 10/1985 | Russell .............. B65D 81/3886 215/13.1 |
| 4,720,023 A | * | 1/1988 | Jeff ................... A47G 19/2288 215/12.1 |
| 4,870,837 A | | 10/1989 | Weins |
| 5,176,278 A | * | 1/1993 | Quarberg ............. B65D 51/007 220/258.2 |
| 5,904,267 A | | 5/1999 | Thompson |
| 5,921,431 A | | 7/1999 | Pych |
| 6,516,967 B2 | | 2/2003 | Duff et al. |
| 7,201,285 B2 | | 4/2007 | Beggins |
| 9,505,527 B1 | | 11/2016 | Campbell |
| 9,988,202 B2 | * | 6/2018 | Haas .................. A47G 23/0241 |
| 2001/0050286 A1 | | 12/2001 | Duff et al. |
| 2003/0146227 A1 | * | 8/2003 | Shimazaki ................ F25D 3/08 220/737 |
| 2005/0126209 A1 | | 6/2005 | Shimazaki |
| 2006/0180594 A1 | * | 8/2006 | Thadani .............. A47J 41/0061 220/737 |
| 2008/0135554 A1 | | 6/2008 | Hill et al. |
| 2010/0288724 A1 | * | 11/2010 | Jahn ................... B65D 81/3881 215/386 |
| 2012/0055192 A1 | * | 3/2012 | Savarese .................. F25D 3/08 62/463 |
| 2014/0319158 A1 | * | 10/2014 | Lonsway .......... B65D 81/3886 220/739 |
| 2017/0166385 A1 | * | 6/2017 | Pisarevsky ......... B65D 81/3881 |
| 2018/0086540 A1 | * | 3/2018 | Haas ................. A47G 23/0241 |
| 2019/0009972 A1 | * | 1/2019 | Spivey ............... B65D 81/3876 |

OTHER PUBLICATIONS

Extended European Search Report dated Dec. 22, 2017 in corresponding European patent application serial No. 15807540.8, all enclosed pages cited.

Examination Report dated Sep. 21, 2017 in corresponding Australian patent application serial No. 2015274809, all enclosed pages cited.

* cited by examiner

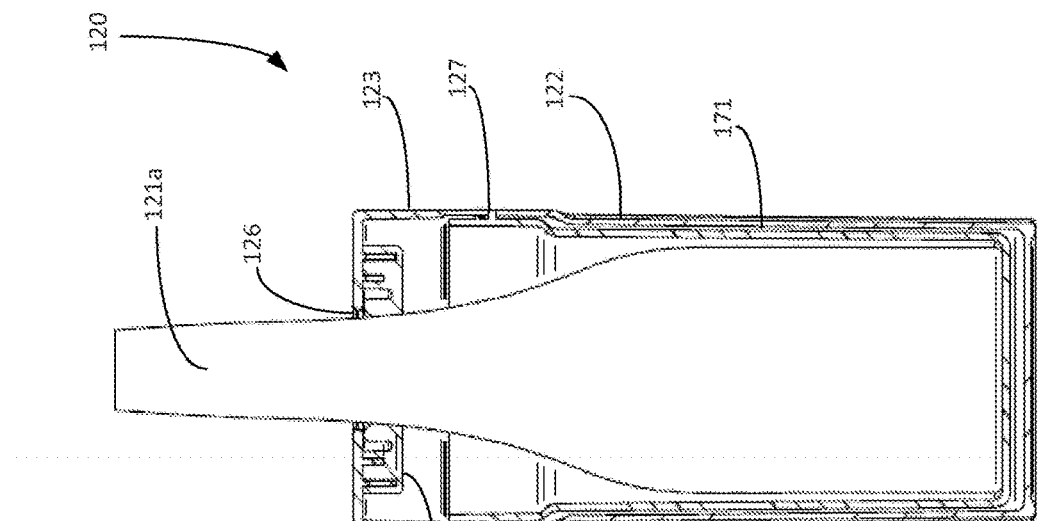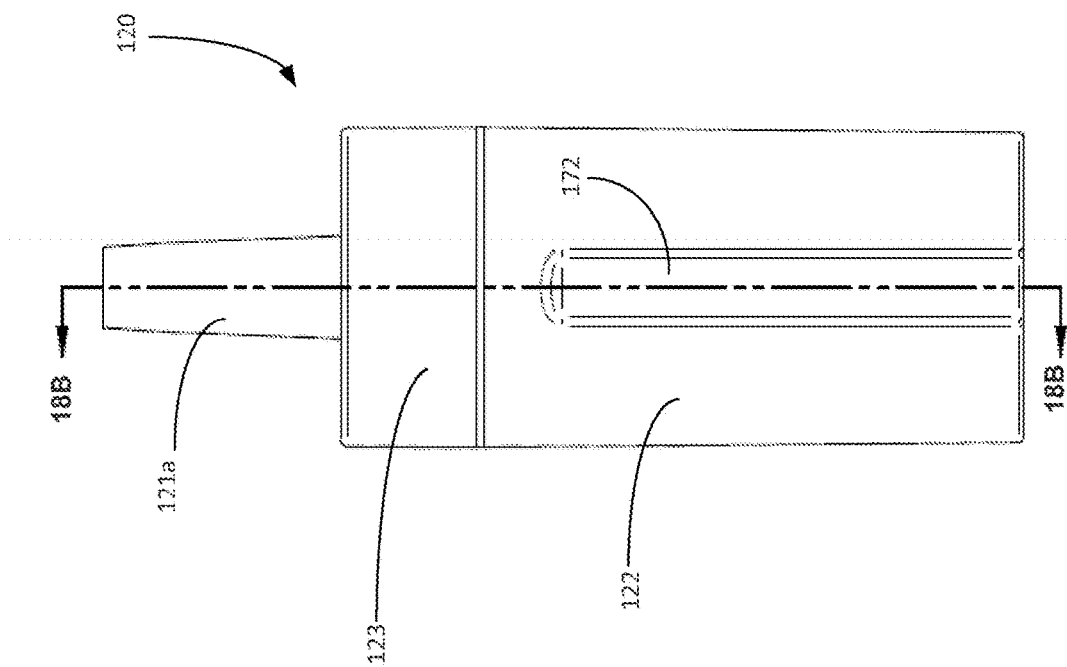

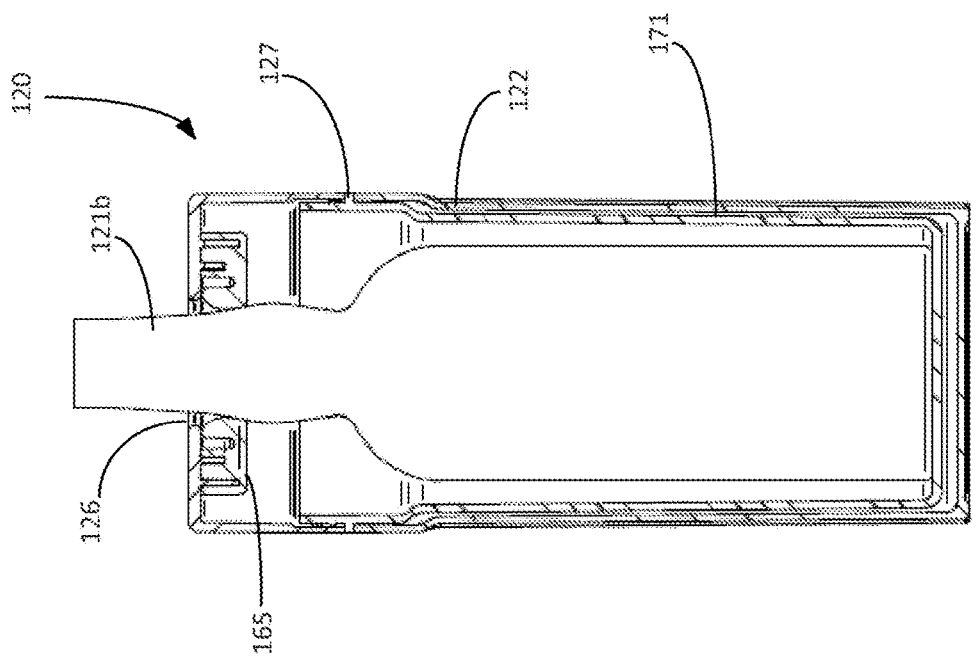
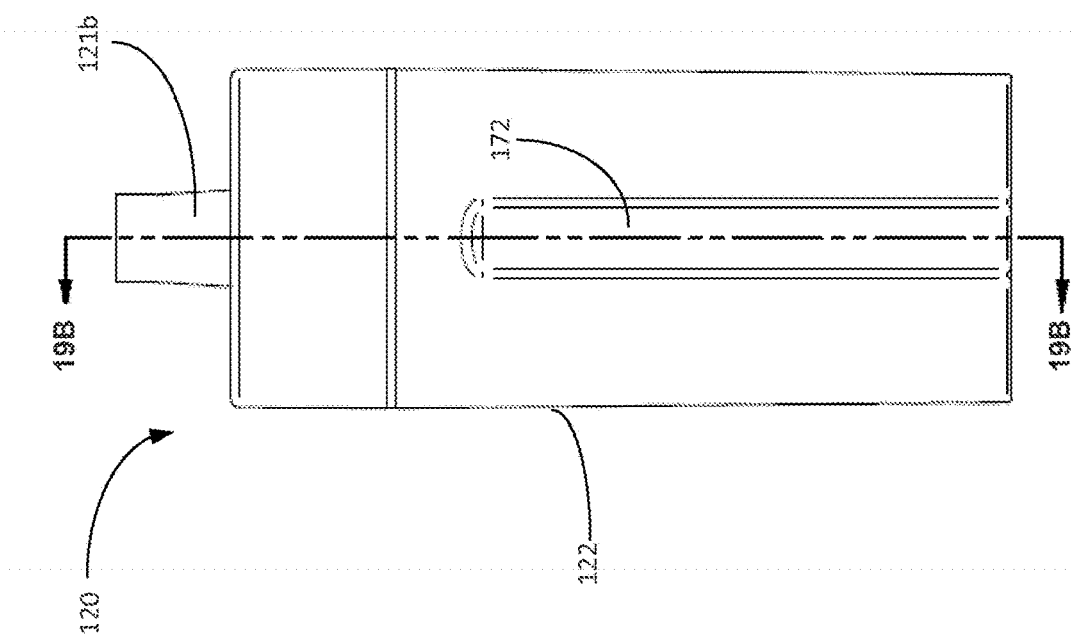

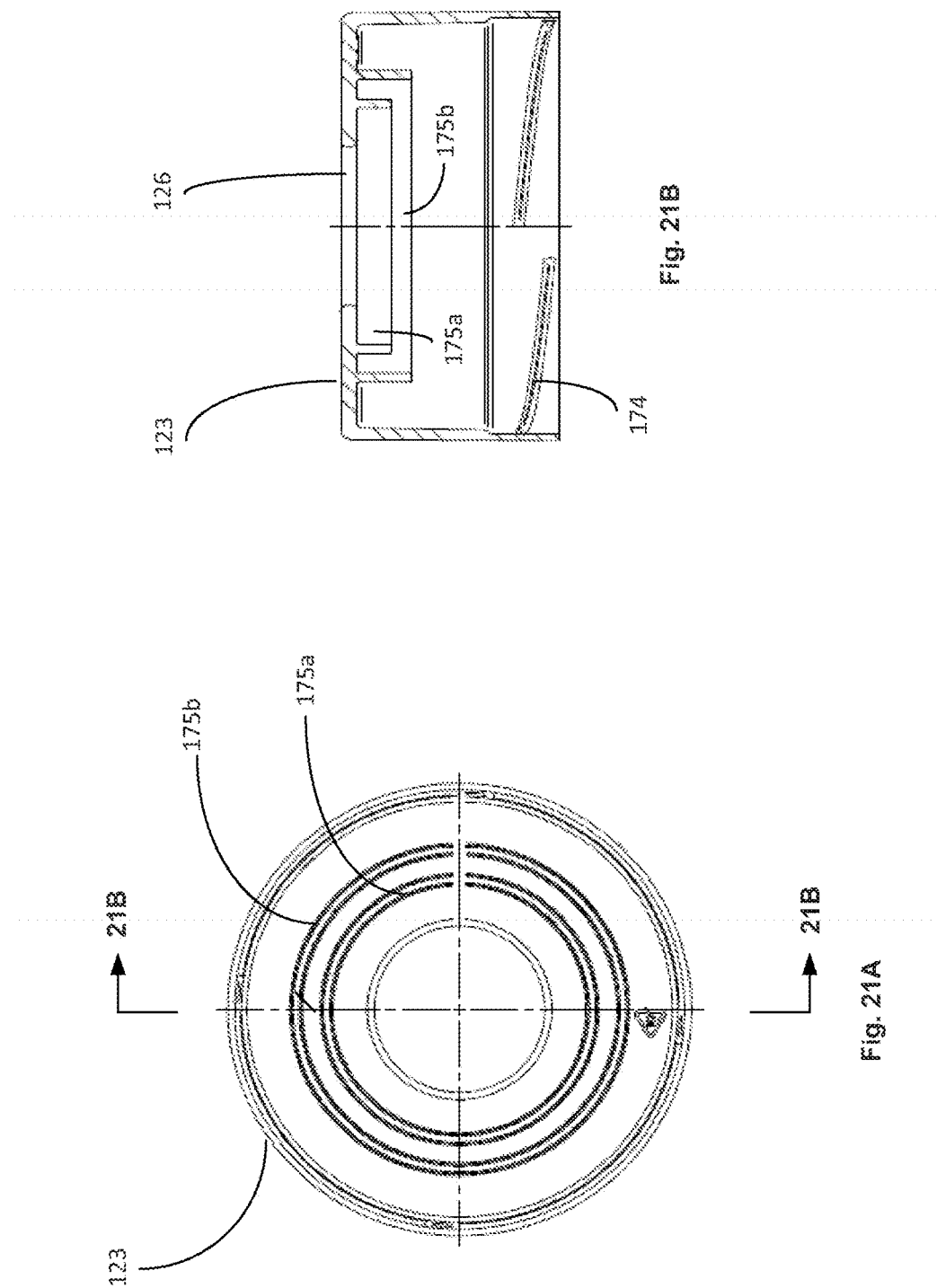

INSULATED BOTTLE HOLDER

PRIORITY CLAIM

This application is based upon and claims priority to U.S. provisional application Ser. No. 62/009,624, filed Jun. 9, 2014, which is relied upon and incorporated fully herein by reference for all purposes.

BACKGROUND OF THE INVENTION

This invention relates to a container that holds a bottle, provides thermal retention properties, better grip, and ease of use.

While wine drinkers have a myriad of options to maintain the temperature of their bottles while in use, they all have problems. Ice buckets make the bottles very slippery often causing users to drop the bottles, require new ice and cleaning for each use, as well as drip water over the users and the table when filling glasses. Stone and ceramic coolers are fragile, require space in a user's refrigerator or freezer prior to use, allow condensation to make bottles very slippery, and exhibit significant thermal loss. While beer drinkers have an even larger variety of vessels to hold their bottles, all of them are designed for the traditional 11.2 or 12 oz size. The craft beer boom and increased importation of premium European beers has created a larger market of 650 ml to 750 ml bottles that was almost non-existent a few years ago.

It would be helpful to have an inexpensive item that would securely accommodate a variety of bottle sizes while keeping the bottles and their liquids cool. Further, it would be advantageous if such a device could be used for promotions or advertising for various businesses.

BRIEF SUMMARY OF THE INVENTION

Aspects of this invention provide a bottle holder for various size bottles that is designed to keep the bottle and liquid cool, enable the user to pour from the bottle while the bottle is in the holder, and protect the bottle from breaking in case of accident. The bottle holder includes a body, comprised of an outer shell and an inner shell, as well as a lid that may be attached to the body such as by screwing it on or by friction. The outer shell preferably has one or more features that enable the user to maintain a better grip. The inner shell and lid have different features to hold the bottle securely. Advantageously, the body and lid provides thermal protection.

Further in accordance with the concepts described herein, a method is provided for holding a variety of shaped bottles with a range of diameters so that the user may pour the liquid from the bottle while the bottle is still in the bottle holder. The method includes inserting a bottle into the body of the holder. For example, smaller diameter bottles may rest in a depression of the inner shell and larger diameter bottles may rest on the rim of the depression. Alternately, a pliable ring insert may compress to hold larger diameter bottles while maintaining a friction surface with smaller diameter bottles. Next, the method involves attaching the lid to the body by first inserting the neck of the bottle through a pliable ring gasket in the aperture in the lid until the lid is in position to be removably attached to the body (such as by inner threads of the lid engaging outer threads of the body). The pliable ring gasket will deflect around the bottle neck to prevent it from moving relative to the lid and the lid being firmly attached to the body will, with the other features in the body, enable the user to pour a liquid from a bottle that is inside the holder from inverted and even upside down positions without the bottle shifting inside the bottle holder and without the bottle holder slipping from the user's grasp. In other embodiments, a resilient seal may extend about the opening in the lid.

The foregoing has outlined rather broadly certain features and technical advantages of the present invention in order that the detailed description may be better understood. Additional features and advantages of the invention will be described hereinafter which form the subject of the claims. It should be appreciated by those skilled in the art that the conception and specific embodiments disclosed may be readily utilized as a basis for modifying or designing other structures for carrying out the same purpose of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of embodiments of the present invention, reference is now made to the following descriptions taken in conjunction with the accompanying drawings, in which:

FIG. 18A is an elevational view of a bottle holder in accordance with an alternative embodiment having a first size bottle therein.

FIG. 18B is a cross-sectional view taken along line 18B-18B of FIG. 18A.

FIG. 19A is an elevational view of the bottle holder of FIG. 18A having a second size bottle therein.

FIG. 19B is a cross-sectional view taken along line 19B-19B of FIG. 19A.

FIG. 21A is a bottom elevational view of the lid of the bottle holder of FIG. 18A.

FIG. 21B is a cross-sectional view taken along line 21B-21B of FIG. 21A.

DETAILED DESCRIPTION

It is to be understood by one of ordinary skill in the art that the present discussion is a description of exemplary embodiments only, and is not intended as limiting the broader aspects of the present invention, which broader aspects are embodiment in the exemplary constructions.

Figure 1:
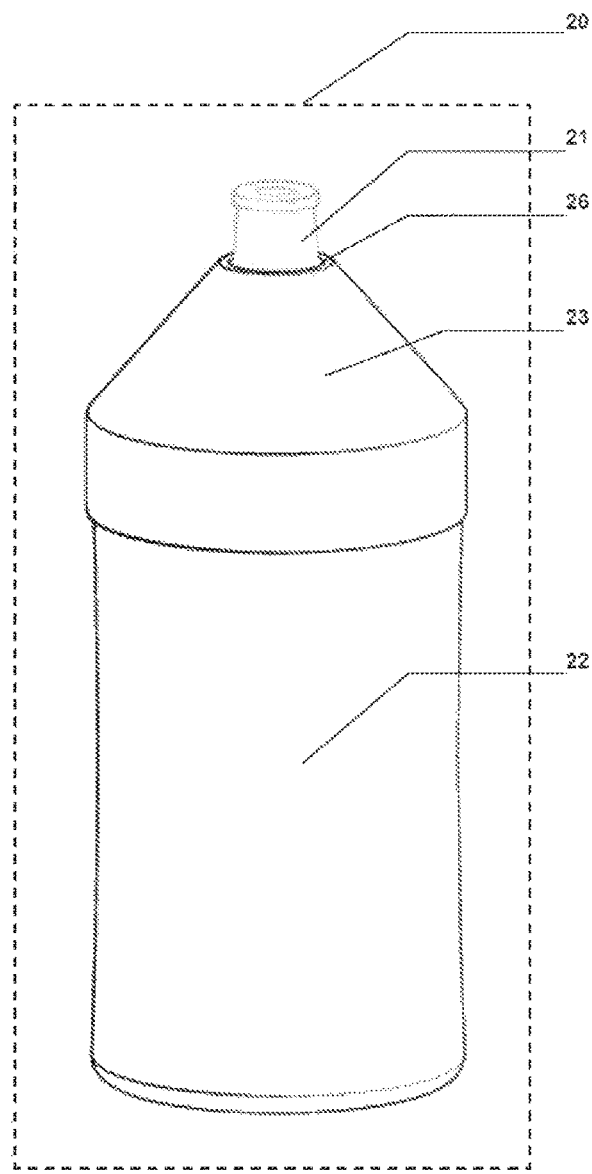
FIG. 1 is an exterior isometric view of an embodiment of a bottle holder according to concepts described herein holding a bottle.

Referring now to FIG. 1, an embodiment of a bottle holder according to an embodiment of the present invention is shown. As described above, it has become popular for craft brewers to sell specialty and higher specific gravity beers in larger bottle sizes than the traditional 12 ounce bottle, typically 22 oz (650.618 ml) or 750 ml bottle sizes. As these bottles (like similarly sized wine bottles) are intended to be shared, there is a need to be able to keep them cool while the beverage is being consumed. None of the plethora of solutions for keeping the standard 12 oz bottle cool and condensation free has transferred effectively to the resurgent bottle size and none of the solutions targeted towards wine bottles addresses all of these concerns. The present invention provides a bottle holder that can be used to effectively hold a variety of larger size bottles firmly while keeping them cool and negating the effects of condensation.

Bottle holder 20 is an embodiment of a device to firmly hold various larger diameter bottles as well as providing a non-slip surface and maintaining the temperature of the bottle. Bottle 21 is held firmly in the bottle holder 20 by placing the bottle 21 into the body 22 of the bottle holder 20 and attaching the lid 23 and permitting the bottle 21 to extend through the aperture 26 so that the beverage inside the bottle 21 may be poured from the bottle 21 when it is inside the bottle holder 20. The bottle 21 is preferably held firmly in place by one or more of a variety of features described below.

Figure 2:
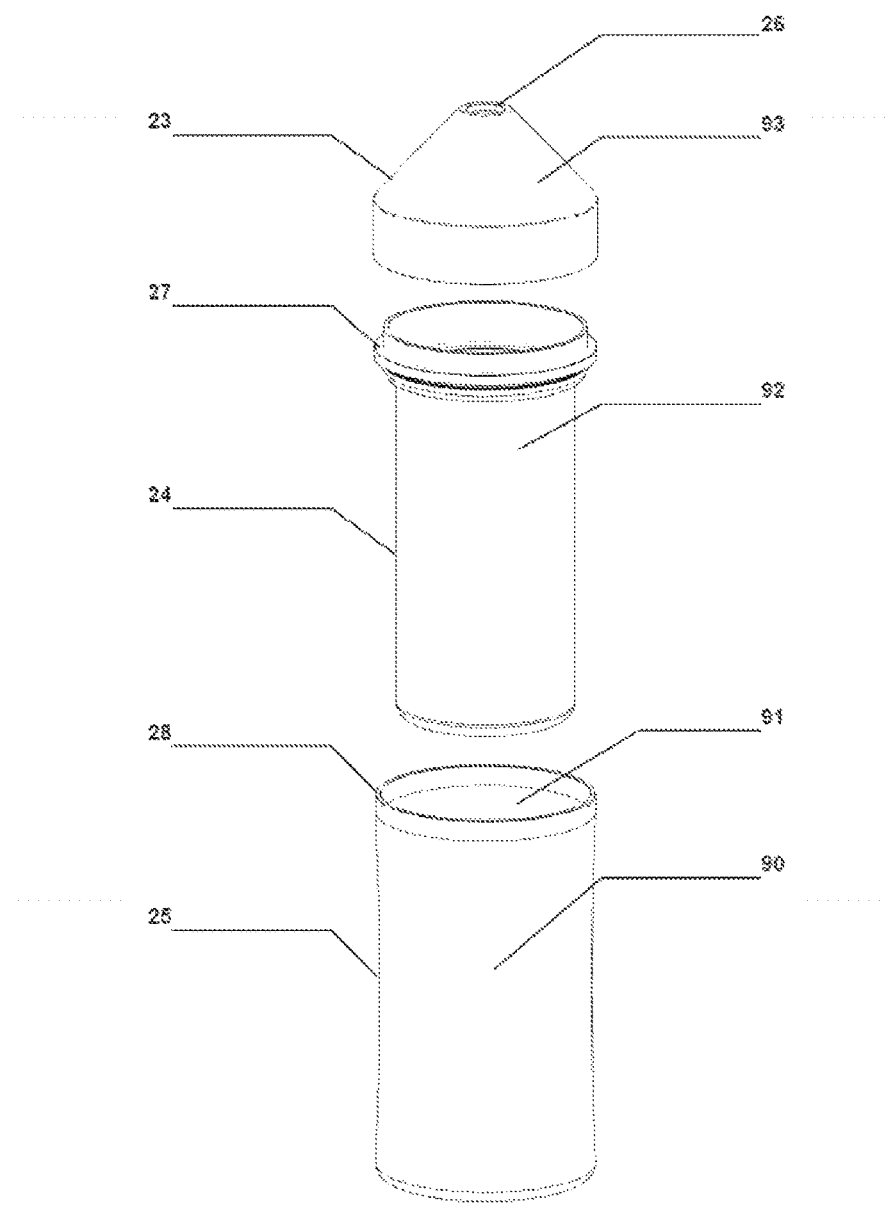
FIG. 2 is an exploded view of the bottle holder of FIG. 1.

FIG. 2 shows the major components of the bottle holder 20. In this embodiment, The body 22 of bottle holder 20 comprises two primary components, an inner shell 24 that is received in an outer shell 25. The inner 24 and outer 25 shells are joined at a seam 28 to form an air tight seal. For example, the inner shell 24 and outer shell 25 may be secured at this location using any suitable technique, such as adhesive, ultrasonic welding, or the like. A special insulative material may be located in the interstitial space between inner shell 24 and outer shell 25, although preferred embodiments employ trapped air as the insulator. The outer surface of outer shell 25 may be textured or have other features to enhance gripping by a user. In this embodiment, the lid 23 is attached to the body 22 at the location defined by a flange 27 of inner shell 24, such as by friction or by threads that engage so the lid 23 can be screwed on.

Figure 3:
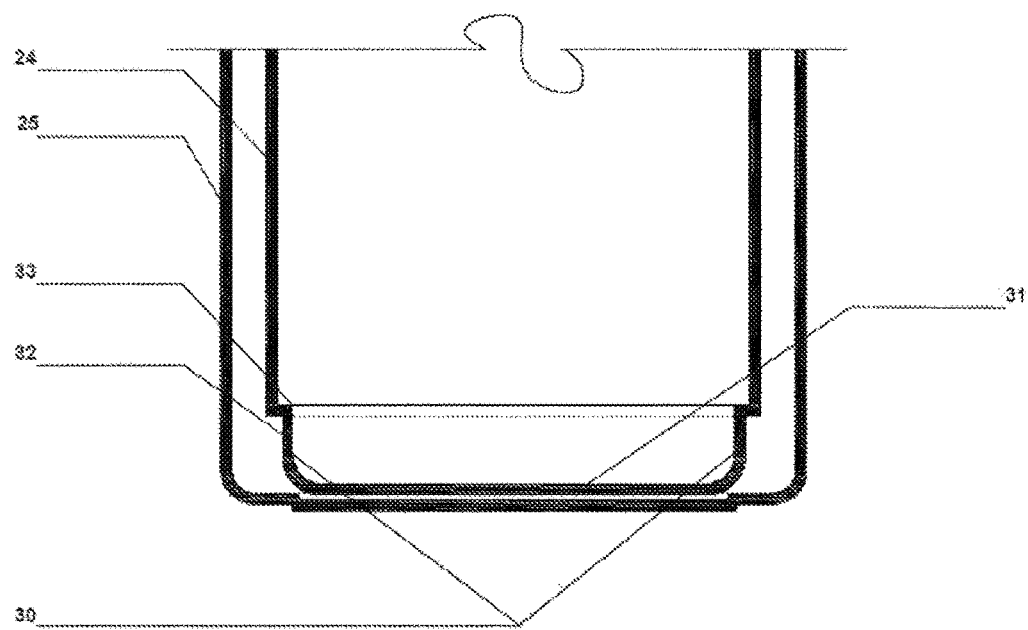
FIG. 3 is an enlarged fragmentary vertical section showing one embodiment of the bottle holder with a depression in the inner shell.
Figure 4:
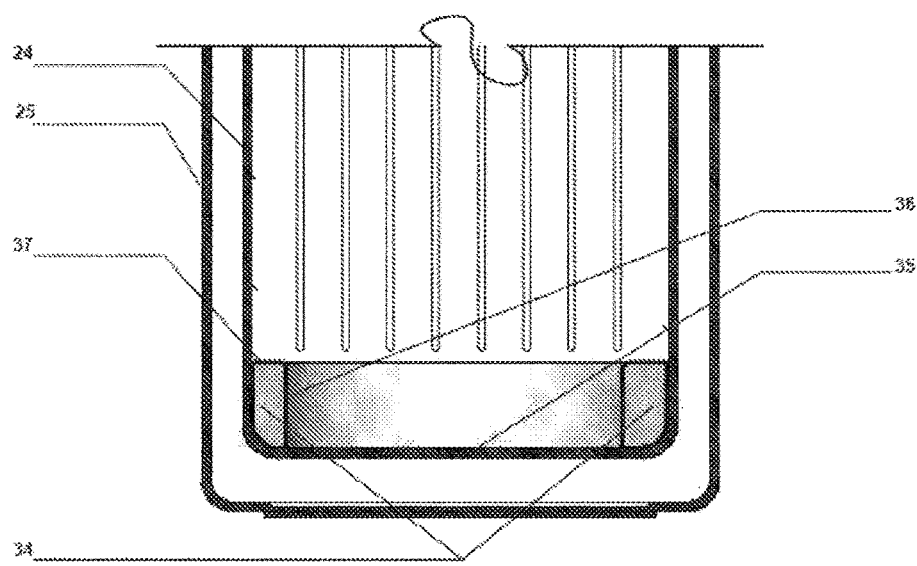
FIG. 4 is an enlarged fragmentary vertical section showing one embodiment of the bottle holder with a pliable (e.g., foam) ring insert in the inner shell.

Referring now to FIGS. 3-4, potential embodiments of the body 22 of the bottle holder 20 are described in greater detail. As described above, bottle holder 20 has an inner 24 and outer 25 shell. At the base of the inner shell 24, there may be a depression 30 that will allow bottles 21 of a smaller diameter to rest firmly at the base 31 of the inner shell 24 and vertical wall 32 of the depression 30 while bottles 21 of a larger diameter would rest on an annular ridge 33 at the top of the depression 30 of the inner shell 24. As shown in FIG. 4, another potential embodiment of bottle holder 20 has a foam or silicone ring 34 (or similarly functioning material) affixed on the base 35 of the inner shell 24. The internal diameter of the foam ring 34 is wide enough that it allows narrower diameter bottles 21 to rest on the base 35 and contact the inner edge 36 of the foam ring 34 which helps hold smaller diameter bottles 21 firmly in place. The internal diameter of the foam ring 34 is narrow enough that it allows larger diameter bottles 21 to rest on the top 37 of the foam ring 34.

Figure 5:
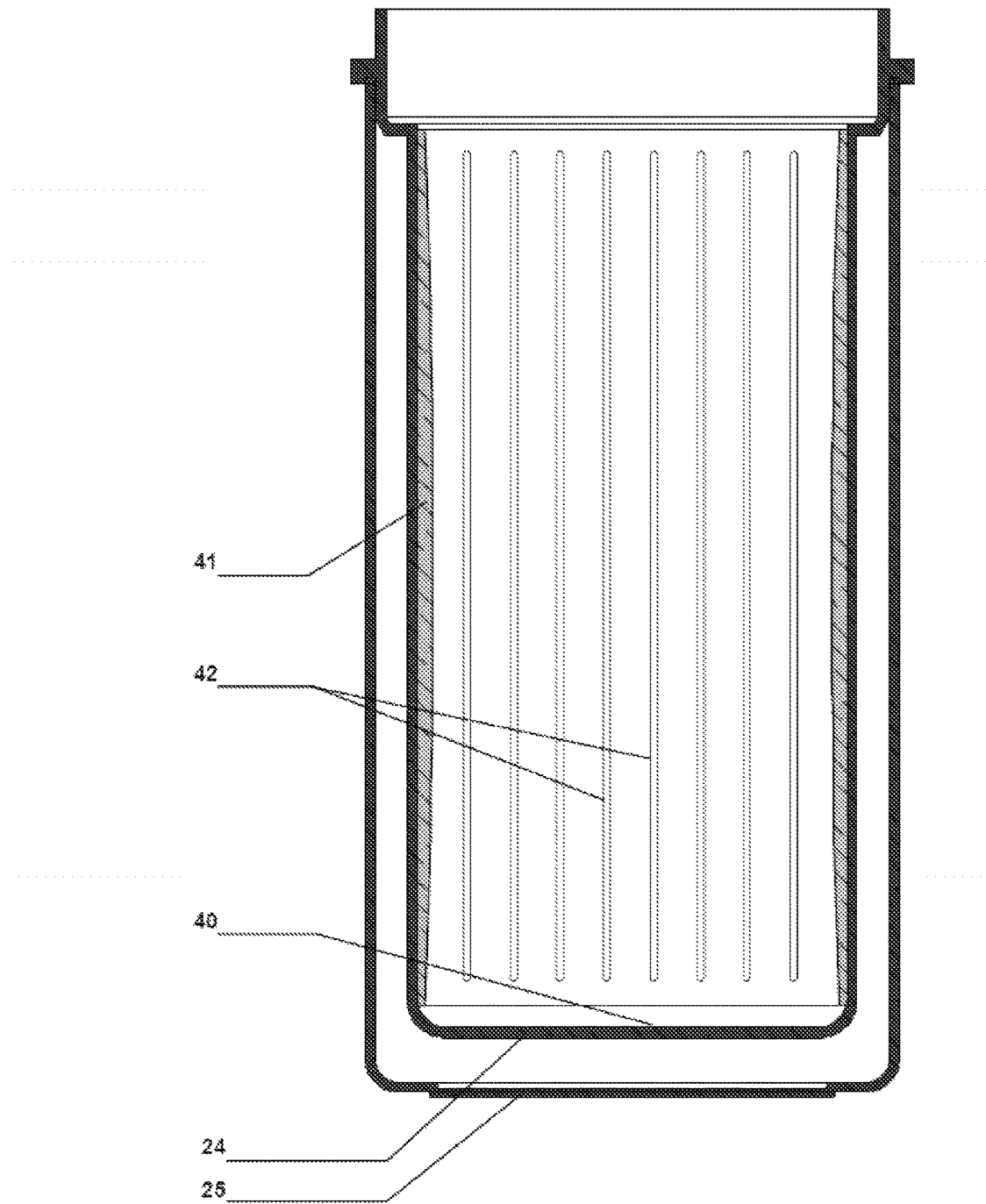
FIG. 5 is a vertical section showing an embodiment of a bottle holder wherein a cylindrical compression foam structure is affixed to the inside of the inner shell.

Referring to FIGS. 5-9, additional potential embodiments of the body 22 of the bottle holder 20 are described in greater detail. As shown in FIG. 5, the inner shell 24 may have a compressible foam sleeve 41 (or similar functioning material) affixed, either chemically or mechanically, to its interior surface 40 which will provide narrower diameter bottles 21 with a high enough coefficient of friction to prevent movement during use. Larger diameter bottles will compress the sleeve 41 when inserted. Preferably, sleeve 41 will have a low enough coefficient of friction under compression from a larger diameter bottle 21 that the user may easily remove the bottle 21. The desired coefficient of may preferably be achieved by using a material that inherently possesses the coefficient or through means of a coating or similar such alteration to the surface. The compressible foam 41 may also have runnels or ridges 42 which would permit air to travel around the bottle 21 when inserting or removing it from the body 22.

Figure 6:
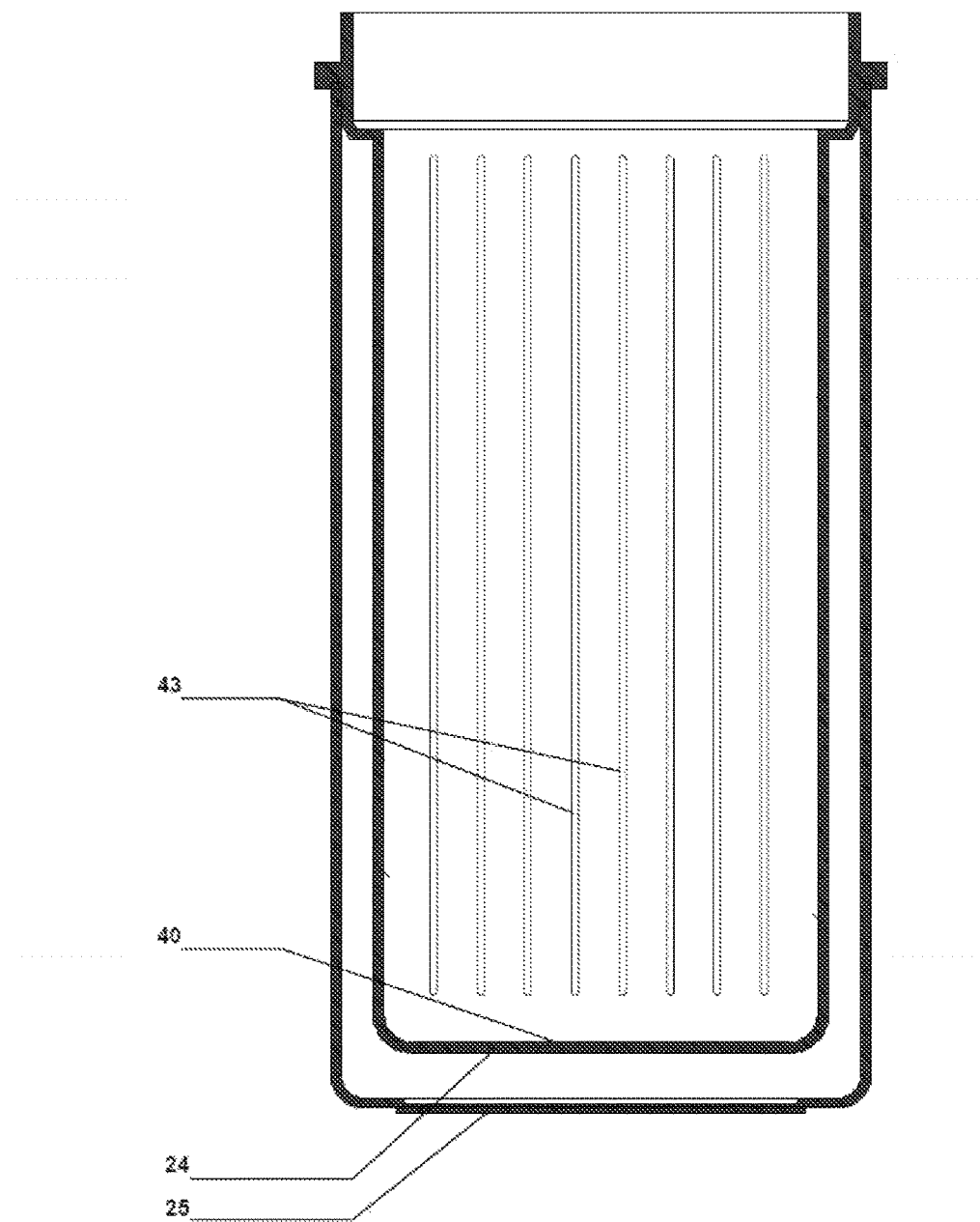
FIG. 6 is a vertical section showing an embodiment of a bottle holder wherein vertical longitudinal extrusions are located on the inside of the inner shell.

In another potential embodiment of the bottle holder 22, shown in FIG. 6, the interior surface 40 of the inner shell 24 has permanently affixed, either chemically or mechanically, a number of extrusions 43 of silicone (or similar functioning material) along the vertical axis of the bottle holder 20. The extrusions 43 will preferably be numerous enough to create a high enough coefficient of friction to prevent movement during use with a narrow diameter bottle 21 as well as a low enough coefficient of friction under compression from a larger diameter bottle 21 that the user may easily remove the bottle 21. The desired coefficient of friction will preferably be achieved by using a material that inherently possesses the coefficient or through means of a coating or similar such alteration to the surface.

Figure 7:
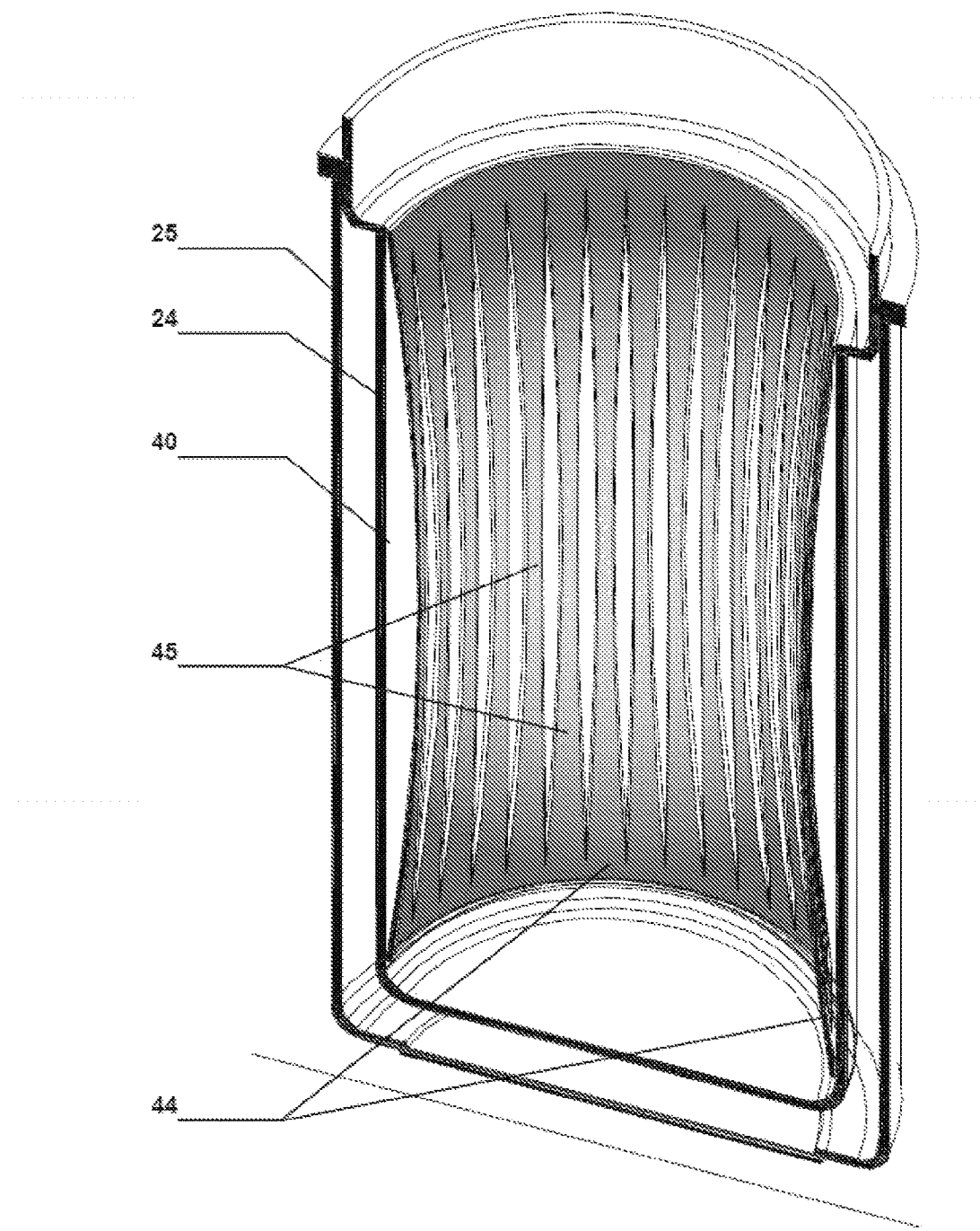
FIG. 7 is an axonometric section showing an embodiment of a bottle holder having a post tensioned insert.

As shown in FIG. 7, in another potential embodiment of the bottle holder 22, an insert 44 of plastic (or similar functioning material) is permanently affixed, either chemically or mechanically, to the interior surface 40 of the inner shell 24. The insert 44 has a series of solids 45 and voids that when compressed vertically and affixed under compression to the inner shell 24 becomes post tensioned and with a convex arc. When a bottle 21 is placed in the body 22, the solids 45 deflect to allow the bottle to enter. The solids 45 when deflecting against the side of a bottle 21, have a high enough coefficient of friction to hold the bottle in place during use, but a low enough coeffiecient of friction that the user may easily remove the bottle 21.

Figure 8:
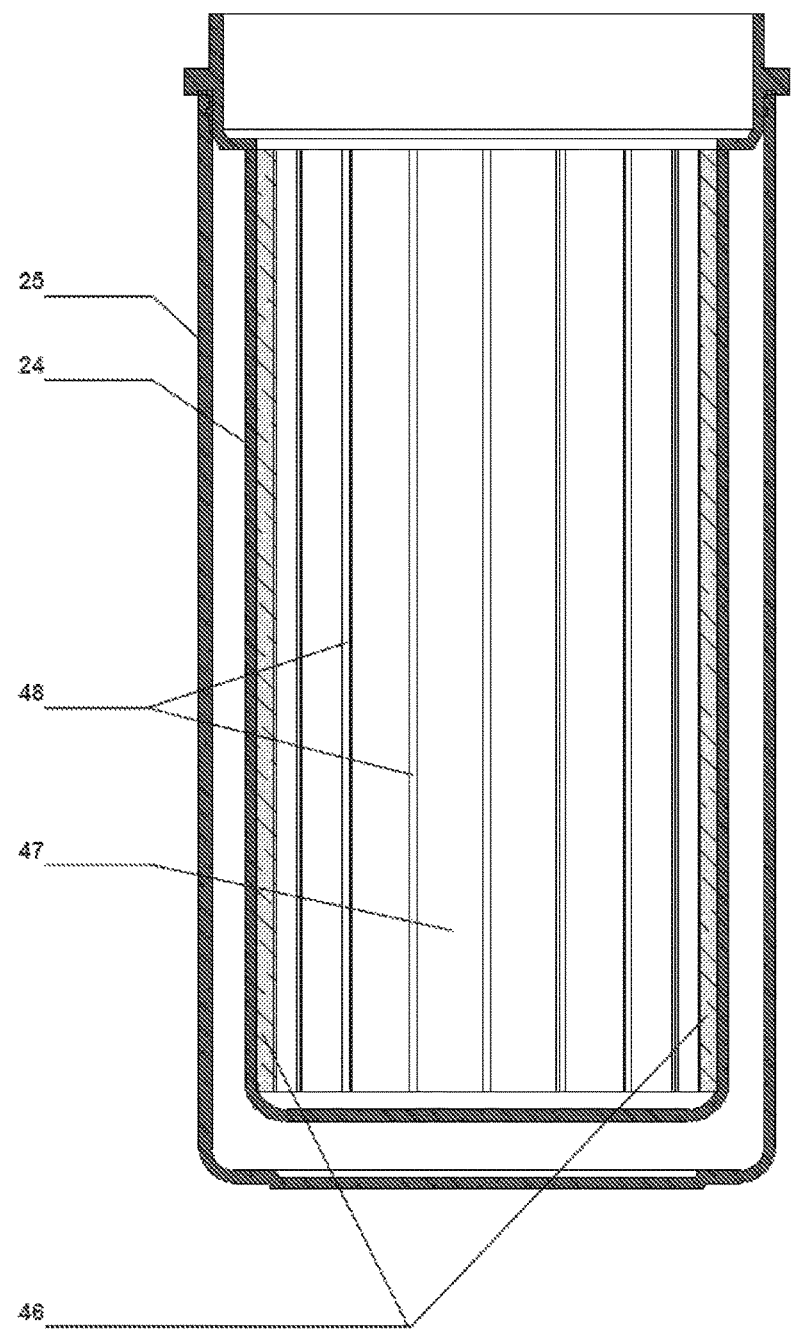
FIG. 8 is a vertical section showing an embodiment of a bottle holder with a removable sleeve.

FIG. 8 shows another potential embodiment of the bottle holder 20 in which a user removable sleeve 46 of plastic or neoprene (or similar functioning material) is inserted into the body 22 of the bottle holder 20 when the user wants to use the bottle holder 20 with a smaller diameter bottle 21. Just as the interior surface 40 of the inner shell 24 provides a surface against which a larger diameter bottle 21 may firmly rest, the interior surface 47 of the removable sleeve 46 provides a similar surface for smaller diameter bottles. The removable sleeve 46 may also have ridges or runnels 48 which would permit air to travel around the bottle 21 when inserting or removing it from the body 22.

Figure 9:
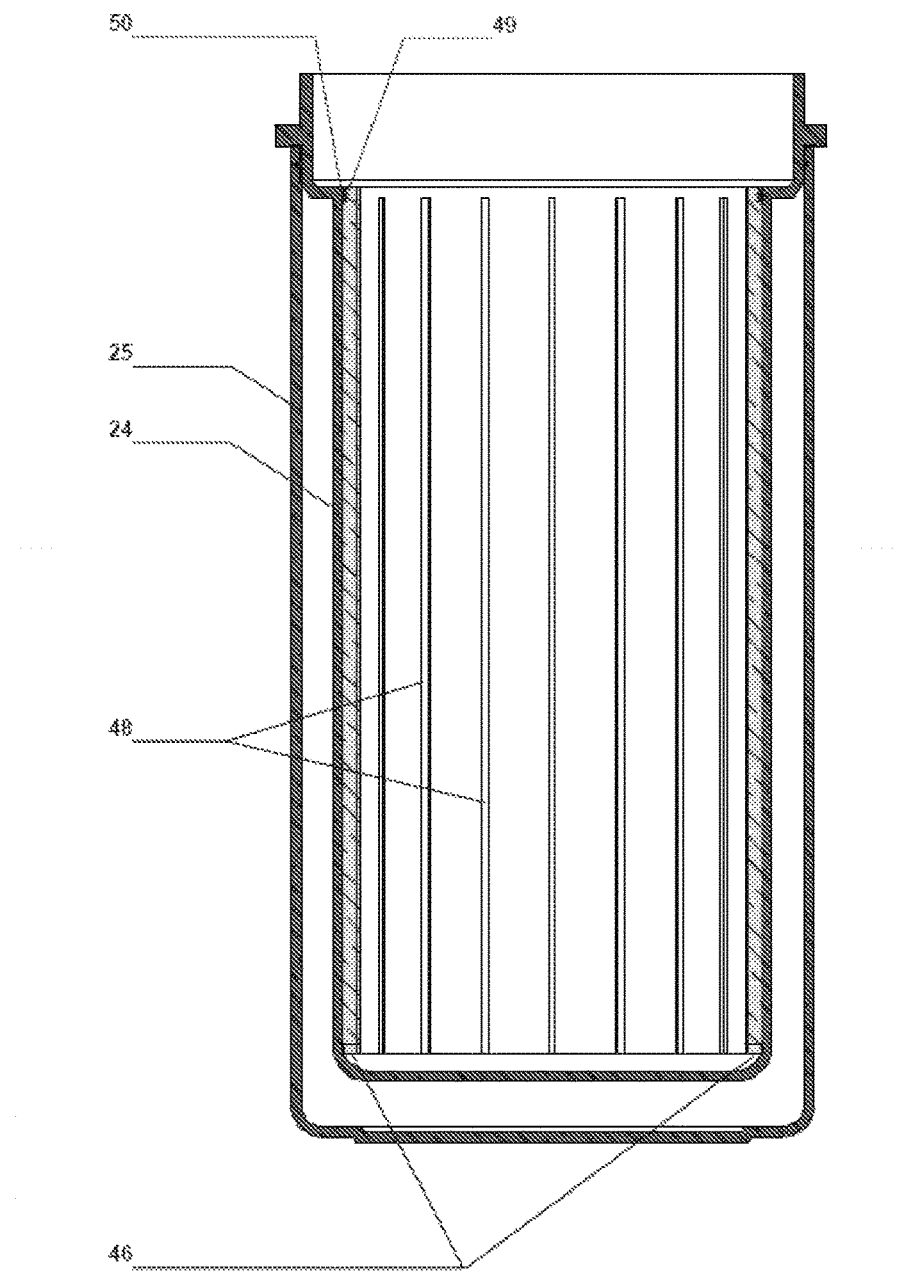
FIG. 9 is a vertical section showing an embodiment of a bottle holder in which the removable sleeve has external threads by which it is retained.

As shown in FIG. 9, another potential embodiment of the body 22 utilizes a removable sleeve 46 having screw threads 49 which screw into threads 50 on the interior of the inner shell 24. This feature enables the user to firmly affix the removable sleeve 46 to the body 22 for use with a smaller diameter bottle 21.

Figure 10:
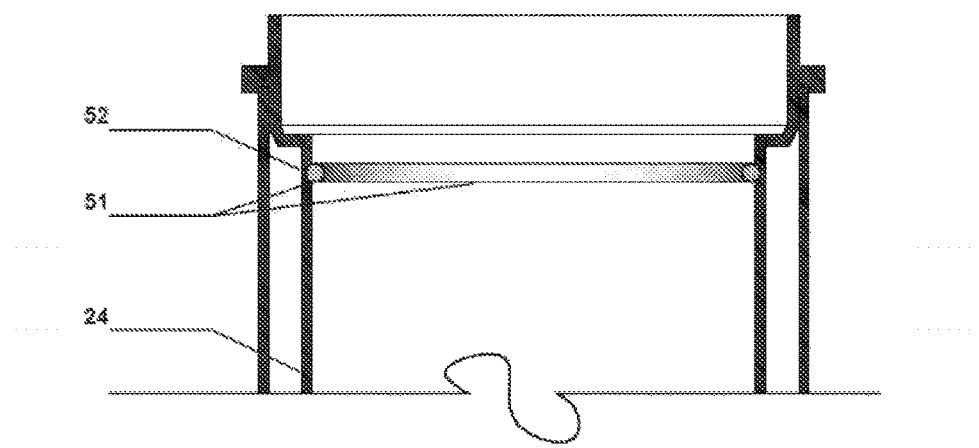
FIG. 10 is an enlarged fragmentary vertical section showing an embodiment of a bottle holder with a pliable ring gasket in one form near the top.
Figure 11:
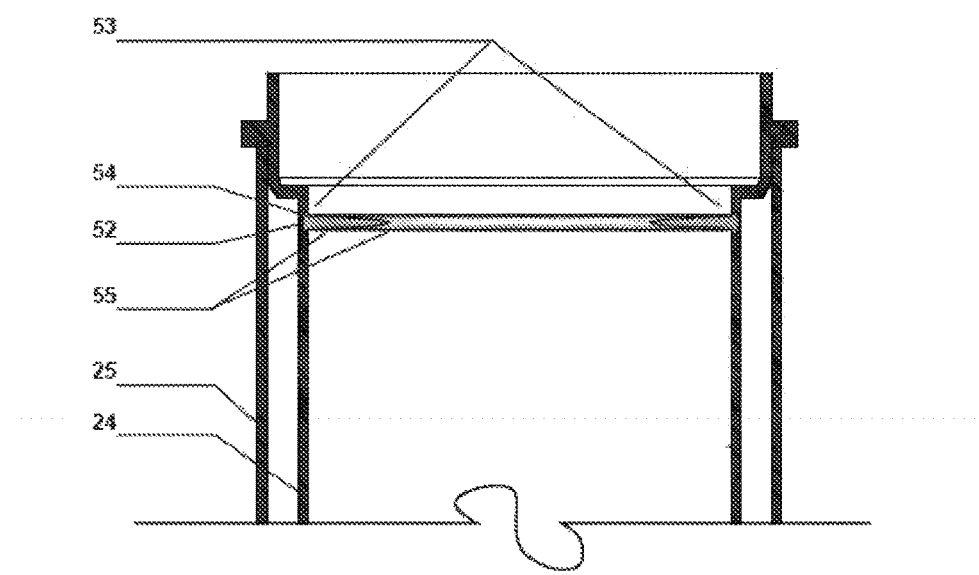
FIG. 11 is an enlarged fragmentary vertical section showing an embodiment of a bottle holder with a flange gasket insert near the top thereof.
Figure 12:
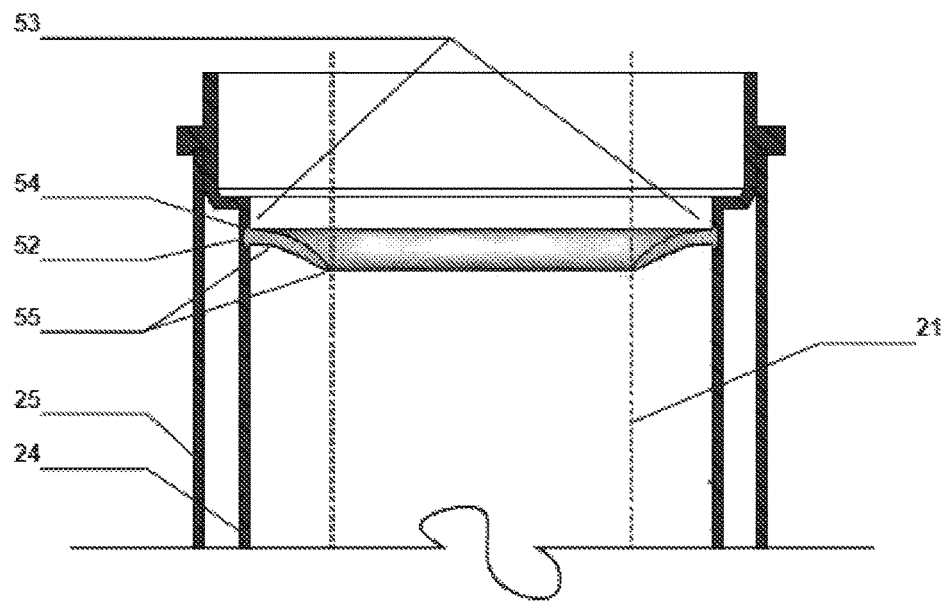
FIG. 12 is an enlarged fragmentary vertical section through the bottle holder showing the manner in which the flange gasket of FIG. 12 deflects around a bottle.

Referring to FIGS. 10-12, embodiments of the bottle holder 20 may have a pliable ring insert 51 (FIG. 10) that is firmly affixed either chemically or mechanically to inner shell 24. For example, insert 51 may be seated in a grove 52 circumscribing the inner surface of shell 24. The pliable ring insert 51 is preferably firm enough to hold standard narrower bottles 21 but pliable enough to be compressed to allow larger diameter bottles 21 to pass by the pliable ring insert 51. In another potential embodiment, a flange gasket insert 53 (FIG. 11) is affixed either chemically or mechanically to inner shell 24. The pliable ring gasket insert 53, when mechanically affixed, for example, may have a shaped edge 54 which will be securely affixed in the groove 52 in the inner shell 24. A significant aspect of the pliable ring gasket insert 53 is the flexible inner portion 55 which can deflect to varying degrees to firmly hold the bottle 21 (as shown in FIG. 12).

Figure 13:
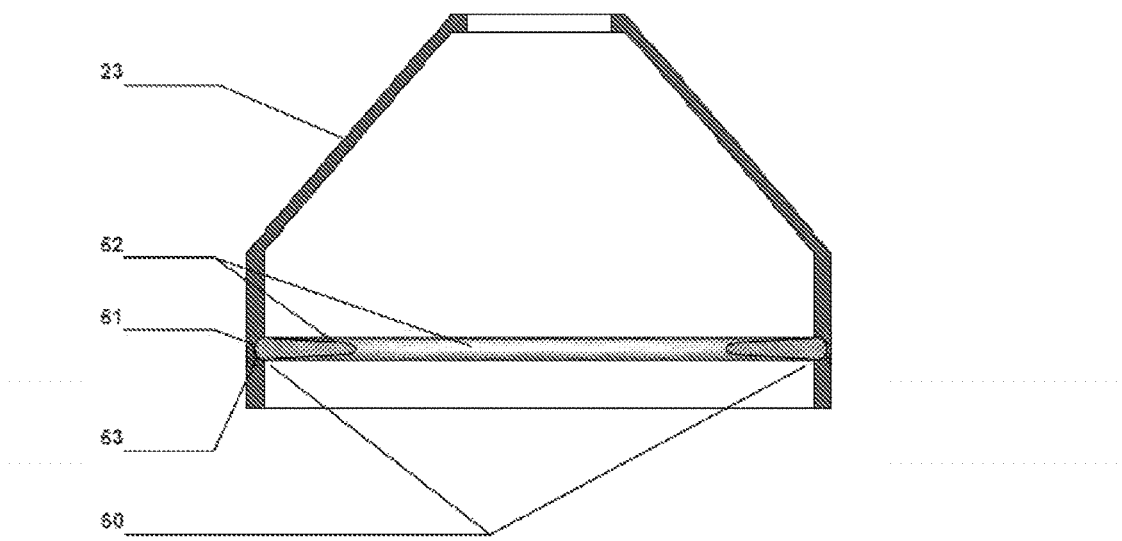
FIG. 13 is a vertical section of a lid with a pliable gasket insert.

Referring to FIG. 13, a potential embodiment of the lid 23 has a pliable ring gasket insert 60 that is either chemically or mechanically attached. If mechanically attached, the pliable ring gasket insert 60 preferably has a shaped edge 61 which will be securely affixed into a groove 63 in the lid 23. A significant aspect of the pliable ring gasket insert 60 will be the flexible inner portion 62 which can deflect by varying amounts to firmly hold the neck 64 of a bottle 21 when the lid 23 is affixed to the body 22.

Figure 14:
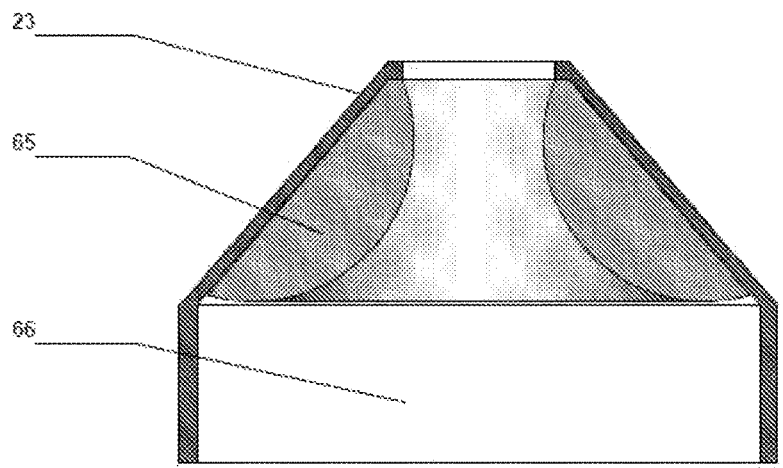
FIG. 14 is a vertical section of a lid with affixed compression foam.
Figure 15:
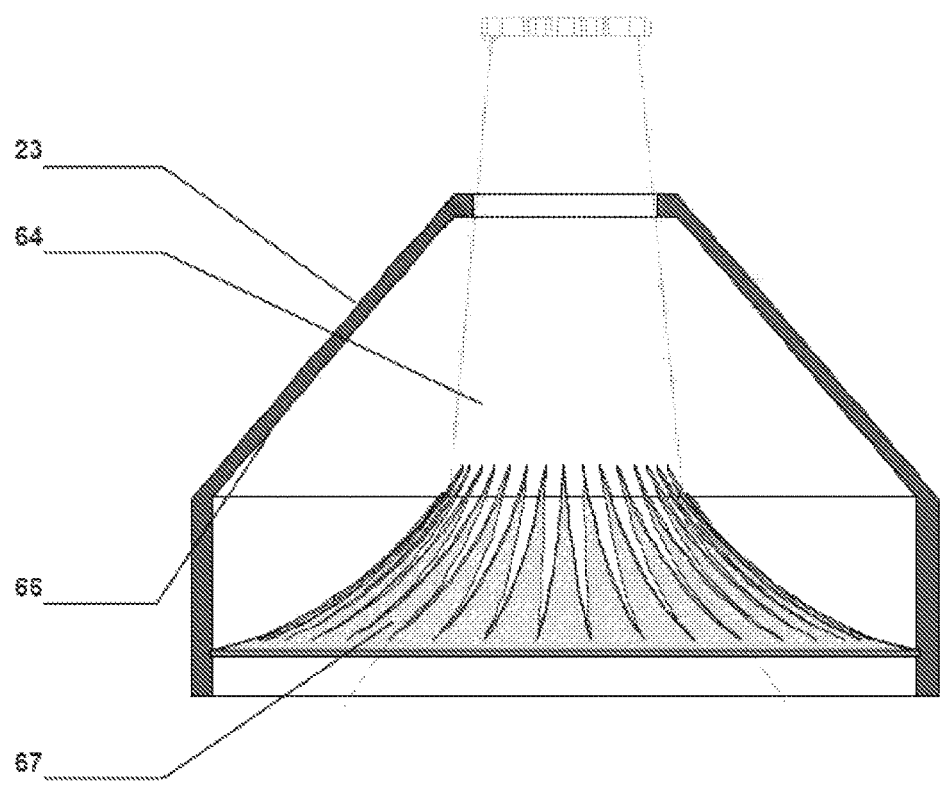
FIG. 15 is a vertical section of a bottle holder lid showing a gasket with prongs engaging a bottle.

As shown in FIG. 14, a potential embodiment of the bottle holder 20 may have a compressible foam ring 65 (or similar functioning material) attached to the inner surface 66 of the lid 23. Another potential embodiment of the lid 23, shown in FIG. 15, has prongs 67 which are affixed to the inner surface 66 either chemically or mechanically. The prongs 67 can deflect to varying degrees to firmly hold the neck 64 of the bottle 21.

Figure 16:
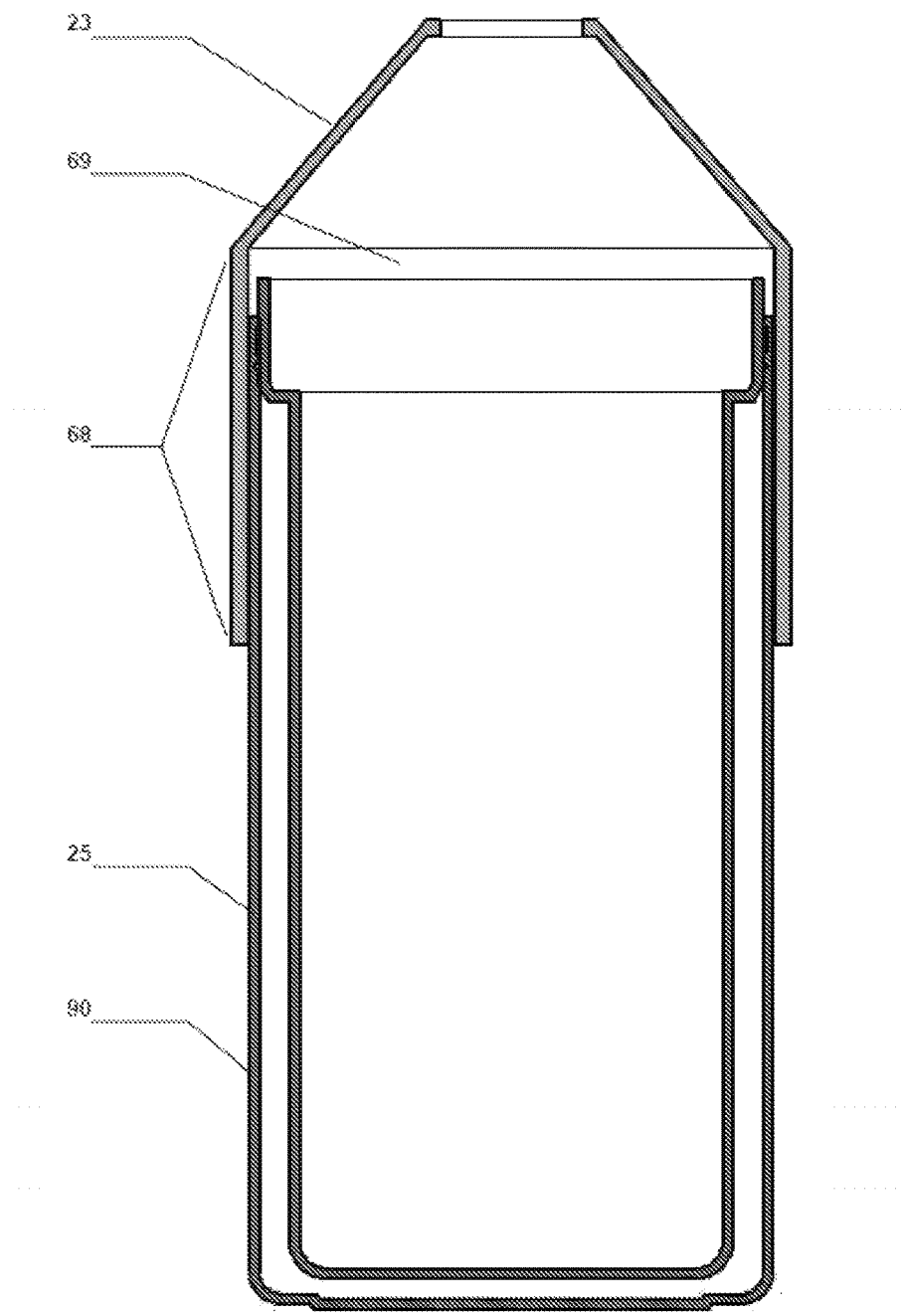
FIG. 16 is a vertical section showing an embodiment of a bottle holder wherein the lid has an extended side.

Referring now to FIG. 16, a potential embodiment of the invention has a lid 23 with an extended side 68 that extends over the outer surface 90 of the outer shell 25. Preferably, the inside surface 69 of the extended side 68 firmly affixes to the outer surface 90 of body 22 by friction. Since the lid 23 with an extended side 68 can slide to varying extents on the outer surface 90 of the outer shell 25, the lid 23 can be lowered on the outer shell 25 so that the bottle 21 is firmly held in place by the aperture 26 in the lid 23. Bottles of different heights and other dimensions can thus be easily accommodated.

Referring again to FIG. 2, certain embodiments of the bottle holder 20 provide space on the exterior 90 and interior 91 of the outer shell 25 as well as exterior 92 of the inner shell 23 and exterior 93 of the lid 23 for promotional or advertising material. For example, graphics may be printed at various locations on the body 22. In the graphics are printed on the outer surface of inner shell 24, or inner surface of outer shell 25, the graphics will be protected during use. A piece of sheet-like material (e.g., paper) can also be inserted into the interstitial space at the time body 22 is manufactured.

Figure 17:
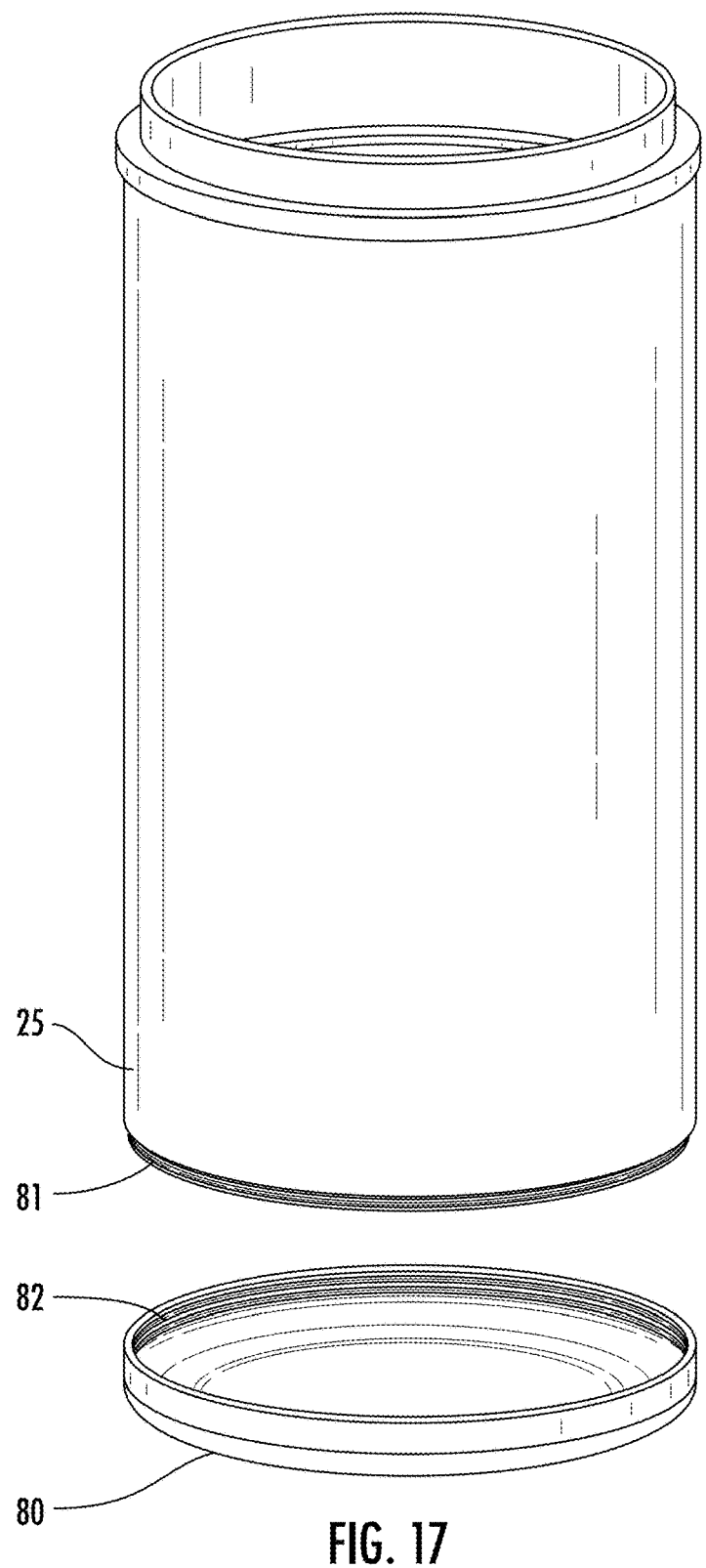
FIG. 17 is an axonometric view of the exterior shell in accordance with an alternative embodiment that has a detachable base.

In some cases, however, it may be desirable to allow the promotional material to be changed, such as in situations where the bottle holder is provided for customer use by a restaurant while the customer is dining. Referring now to FIG. 17, an embodiment of the bottle holder 20 is shown in which the body 22 has a removable base 80 that can be attached to the outer shell 25. For example, base 80 may be secured via threads 82 which engage threads 81 on the outer shell 25. This would permit the user to insert their own promotional or informative materials into the bottle holder 20 and change the material whenever desired.

Referring now to FIGS. 18A through 19B, a bottle holder 120 constructed with an additional embodiment of the present invention is illustrated. In FIGS. 18A-18B, bottle holder 120 being used with a bottle 121a of a first size. A bottle 121b of a second size is shown in FIGS. 19A-19B. Bottle holder 120 is constructed so that both size bottles are securely maintained without relative movement with respect to bottle holder 120. Like the previous embodiment, bottle holder 120 has insulative properties that tend to maintain the initial temperature of the bottle as the contents of the bottle are consumed.

Figure 20:
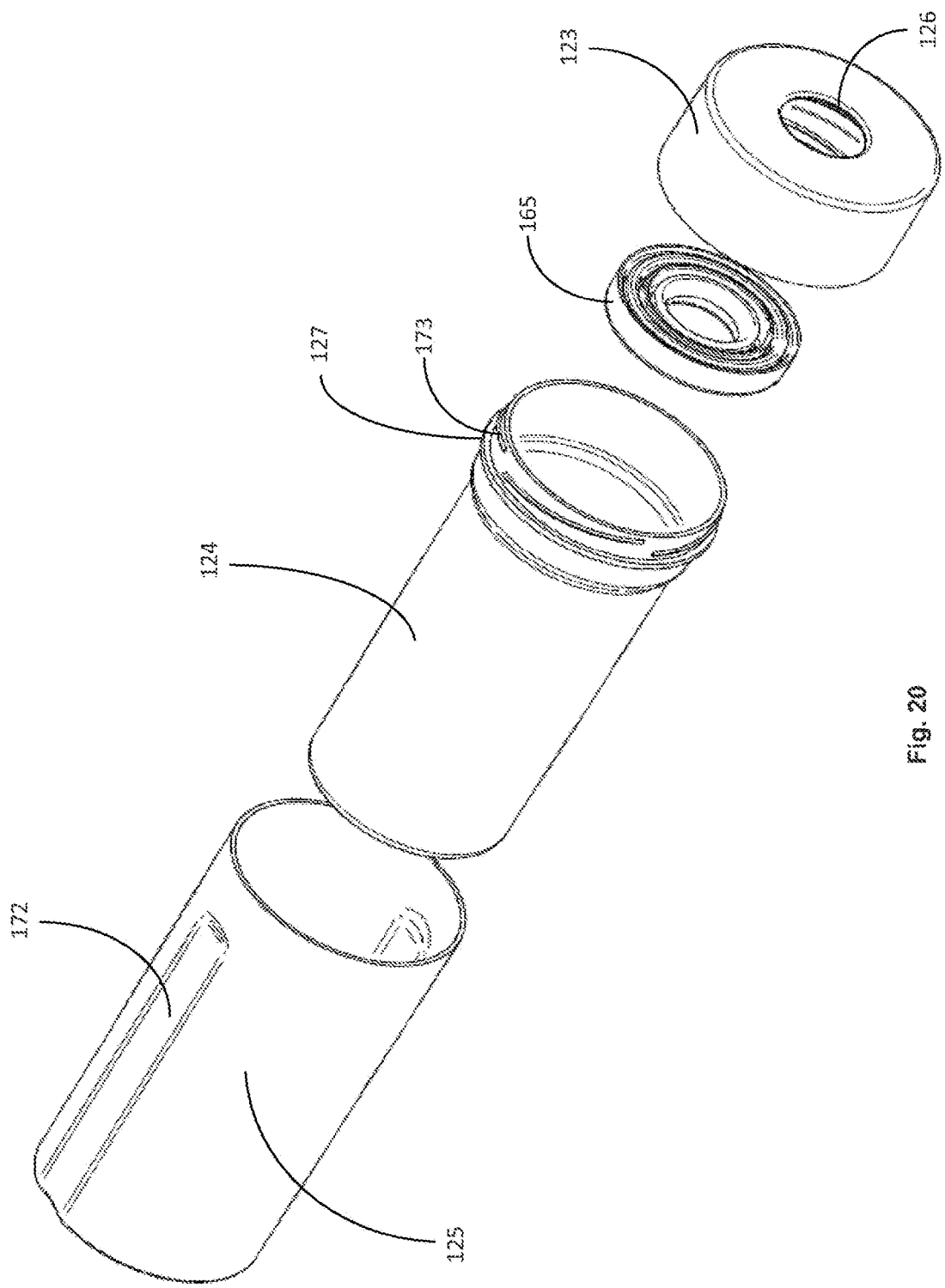
FIG. 20 is an exploded perspective view showing components of the embodiment of FIG. 18A.

Referring now also to FIG. 20, the major components of bottle holder 120 can be seen. An inner shell 124 is received in an outer shell 125 to form a main body 122. As can be seen, inner shell 125 has an upper portion defining an annular flange 127 which serves as a stop when the components are assembled. Inner shell 124 and outer shell 125 can be secured together, preferably in an air tight manner, via any suitable technique, such as adhesive, ultrasonic welding, or the like. As can be most clearly seen in FIGS. 18B and 19B, an interstitial space 171 is defined between inner shell 124 and outer shell 125. The air or other gas trapped in space 171 serves to further insulate the interior cavity of bottle holder 120 from ambient.

The exterior surface of body 122 may have features that facilitate gripping as a user holds it for pouring. In this embodiment, for example, a pair of vertical gripping channels (such as channel 172) are formed at diametrically opposite locations on outer shell 125. In alternative embodiments, surface texture may be provided on body 122 in addition to or in lieu of channels 172.

Adjacent flange 127, inner shell 124 further comprises an attachment portion 173 at which lid 123 is secured. In this embodiment, attachment portion 173 includes outer threads which are engaged by inner threads 174 of lid 123 (FIG. 21B). One skilled in the art will appreciate, however, that other suitable attachment mechanisms may be employed in accordance with the present invention.

As can be seen in FIGS. 18B and 19B, bottle holder 120 further comprises a seal 165 that engages the neck of bottle 121 near the aperture 126 of lid 123. In this regard, seal 165 is adapted to accommodate bottle necks of various diameters in a manner that inhibits relative movement between bottle holder 120 and the bottle 121. As will be explained more fully below, smaller diameter bottle necks are engaged frictionally by an engaging portion of seal 165. The lid itself serves a stop preventing axial movement of the bottle relative to the bottle holder as the contents of the bottle are poured. In the case of larger diameter bottles, seal 165 will be displaced somewhat as it engages the bottle neck which also securely maintains the bottle in position.

Inner shell 124, outer shell 125, and lid 123 are preferably formed of any suitable rigid material. For example, in many embodiments, it may be desirable to use a BPA-free clear plastic (e.g., polypropylene) as the material from which these components are formed. Clear plastic has the advantage is allowing the bottle 121 to be seen when it is contained in bottle holder 120, as well as facilitating interior graphics or advertising placards that may be provided in the interstitial space.

Referring now to FIGS. 21A-22B, seal 165 is preferably formed of a suitable resilient material such as silicone. In this embodiment, seal 165 is advantageously attached to the underside of lid 123 in a removable manner by a press-fit arrangement. Specifically, seal 165 is held in place in the illustrated embodiment by a friction force on four surfaces. In this regard, seal 165 has an attachment portion that defines a pair of concentric circular slots 174a and 174b (FIGS. 22A and 22B) that respectively correspond to concentric circle ridges (or rings) 175a and 175b in the lid 123 (FIGS. 21A and 21B). Preferably, the slots 174a and 174b in the seal are slightly smaller than the corresponding ridge 175a and 175b in the lid. Additionally, the separation or spacing between the two concentric slots 174a and 174b in the seal is slightly larger than the space between the corresponding ridges 175a and 175b in the lid. When the seal is placed onto the lid, the non-matching dimensions force the seal to compress between two concentric ridges as well as causing the inner and outer sections of the seal that touch the vertical sections of the ridges to deflect around the ridges. The compressive and elastic properties of the seal material create a lateral force against the ridges on all of the ridge's vertical surfaces. The lateral force is such that normal use will not create enough downward force on the seal to overcome the increased friction force against the ridges but still enable the user to easily remove the seal by hand for cleaning.

Figure 22B:
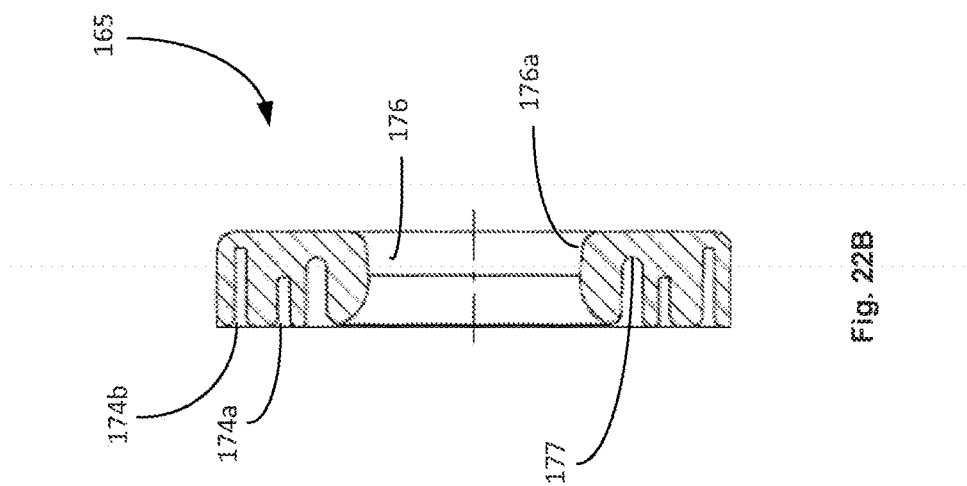
FIG. 22B is a cross-sectional view taken along line 22B-22B of FIG. 22A.
Figure 22A:
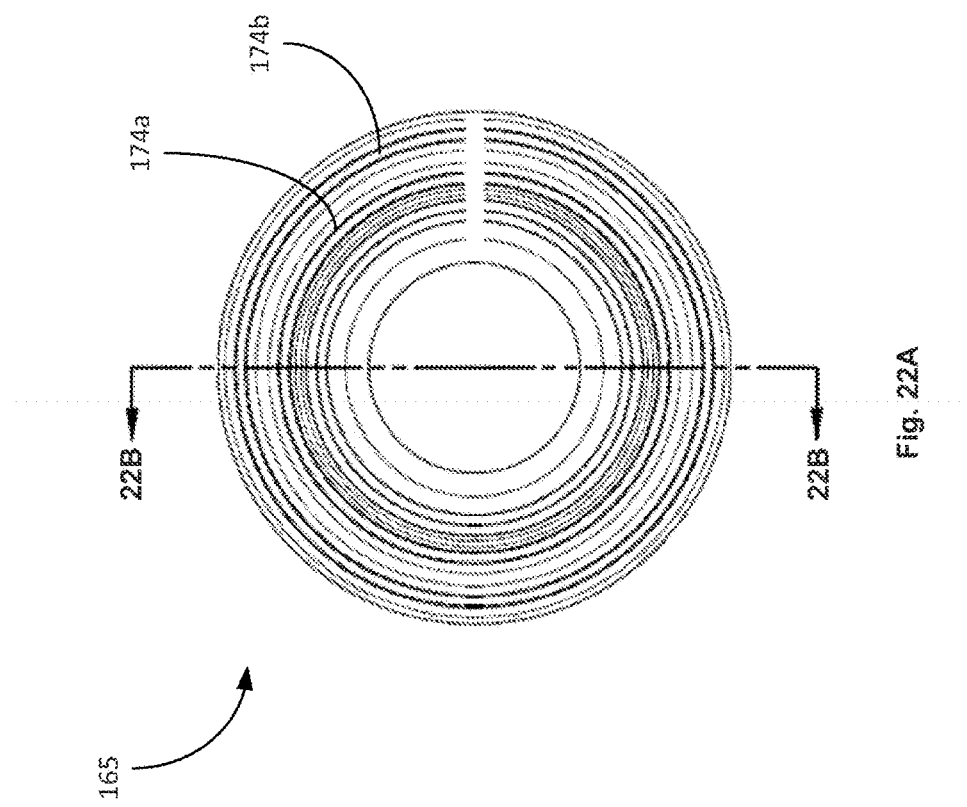
FIG. 22A is a top elevational view of the seal of the bottle holder of FIG. 18A.

As can be most clearly seen in FIG. 22B, seal 165 has an engaging portion 176 integrally connected to the attachment portion via a reduced-width web portion 177. The inner edge of engaging portion 176, which comes into contact with the neck of the bottle, is designed for two specific functions. First, as shown in FIG. 23A, the lower half 176a of the surface is shaped so that with smaller bottles that will not be displacing the seal, the maximum amount of surface area will be in contact with the bottle. This creates a higher friction force that must be overcome for the bottle to shift when the product with a full bottle inside is being tilted during use. The friction force is high enough that the weight of the bottle and liquid does not cause the bottle so shift during use which results in spills. Note that the upper half 176b of the engaging portion 176 itself engages the underside of lid 123 which limits its movement as the bottle holder is lifted and turned while the bottle contents are poured.

Figure 23B:
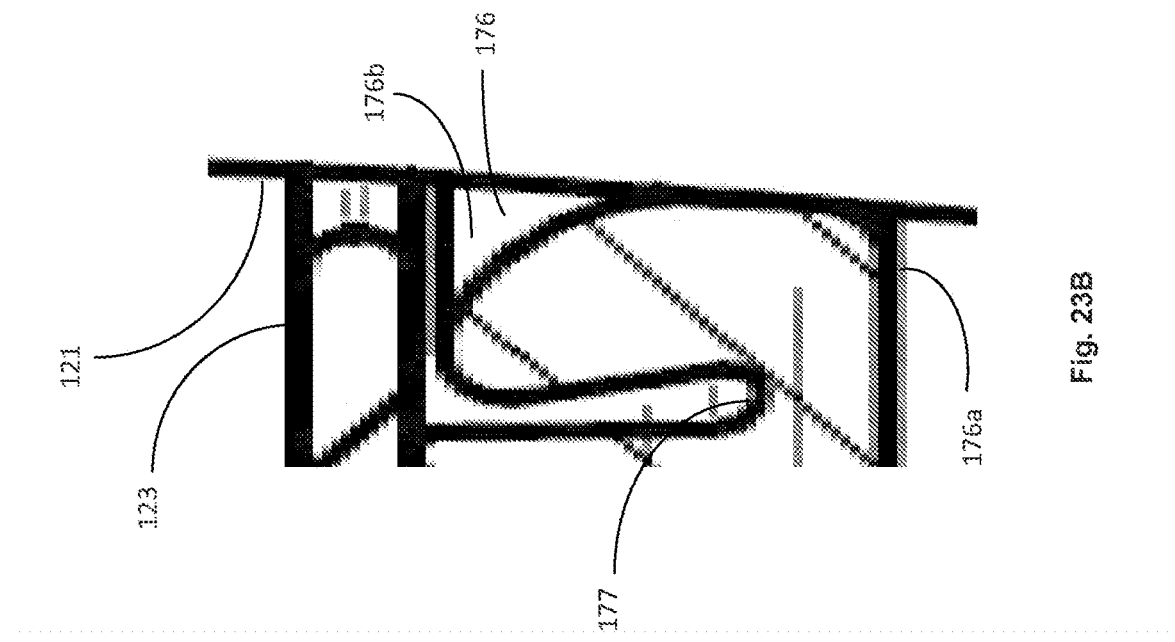
FIGS. 23A and 23B are enlarged fragmentary views of the seal of the embodiment of FIG. 18A engaging a smaller neck bottle without substantial deflection and engaging a larger neck bottle with deflection, respectively.
Figure 23A:
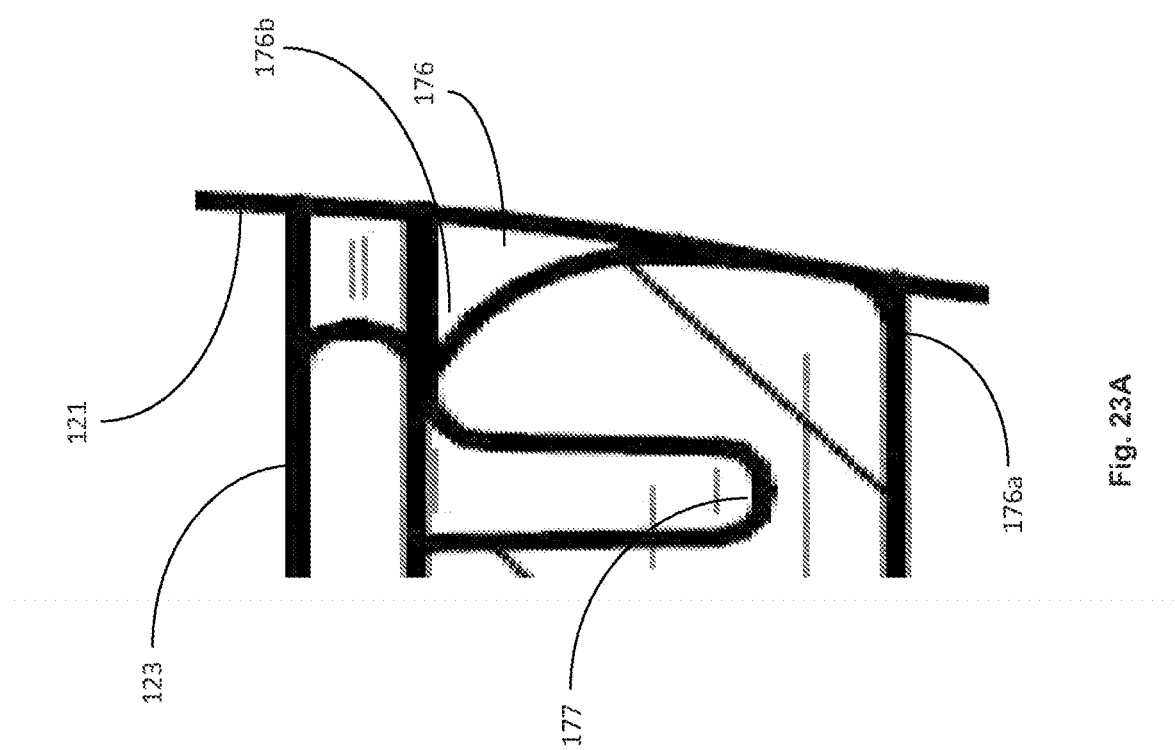

Second, as shown in FIG. 23B, the upper half 176b of the engaging portion 176 is shaped to allow slight deflection towards the ridges when placing the lid with seal onto a bottle to allow wider collars of bottles as well as cages and foils that are commonly found on sparkling wine. When removing the lid with seal, the shape allows the seal to slightly deflect in towards the bottle in case a collar or cage catches on the seal, but not be pulled from the lid. The curvature outward at the top of the seal minimizes the amount inwards towards the bottle that the seal will deflect. In the event that a bottle collar or cage does catch seal and begin to remove the seal from the lid, the seal is designed to deflect and almost become a hinge with the point of rotation slightly inward from the innermost ridge (i.e., at web portion 177). The deflection caused by the downward movement creates an even stronger force against the outside of the innermost ridge which overcomes any loss of friction caused by deflection by the inside edge of the inner most ridge (the contact between the seal and lid around the outer ridge is not noticeably impacted), thus keeping the seal attached to the lid in extreme use.

Given the wide variety of large format bottles in common trade, the seal accommodates their varying dimensions by a combination of compressing and deflecting for the larger bottles, but remaining rigid enough to not deflect or compress under the weight of smaller bottles. When a larger diameter neck or shoulder of a bottle comes into contact with seal 165, the seal displaces to accommodate the bottle by two mechanisms. The inner portion of the seal deflects into the air gap at web portion 177. The seal utilizes the elastic nature of the material to stretch at the bottom inner corner of the edge of the seal, deflecting the solid portion into the gap. When the displacement is not enough for large bottles, the seal relies on the compressive ability to compact in space. The combination of deflection and compression allow the seal to hold large necked and shouldered bottles in place while remaining rigid enough to enable maximum surface contact of the inner edge of the seal with smaller bottles to maintain enough friction force to keep smaller bottles in place.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A bottle holder device for containing a beverage bottle having a neck defining an opening through which contents of the bottle are poured by a user, said bottle holder device inhibiting temperature change during a period of time in which said contents are consumed, said bottle holder comprising:
   a body having a base portion and a generally cylindrical portion for receipt of said bottle;
   said body configured to have thermal insulator characteristics which inhibit temperature change of said bottle;
   a lid having a lower portion adapted to removably engage said body and an upper portion, said body and said lid together defining an interior cavity for containing said bottle;
   said lid defining an aperture through which said neck of said bottle will extend to allow said contents of said bottle to be poured; and
   a seal carried by said lid and being formed of compressible material, said seal having an attachment portion attached to said lid and a flexible web portion connecting said attachment portion and an engaging portion, said engaging portion being widened so as to contact said neck of said bottle adjacent said aperture to accommodate and maintain different sizes of said bottle;
   wherein said attachment portion, said web portion, and said engaging portion of said seal form a generally U-shaped configuration with said web portion being at the bottom of said U-shaped configuration and thereby providing an air gap between said attachment portion and said engaging portion, said web portion of said seal being spaced apart from an inner surface of said lid toward said base portion of said body such that said engaging portion may deflect into the air gap as said neck is received through the aperture of the lid to accommodate said bottle, an upper portion of said engaging portion of said seal being curved outward.

2. A bottle holder device as set forth in claim 1, wherein said body comprises an inner shell received in an outer shell.

3. A bottle holder device as set forth in claim 2, wherein an interstitial space is defined between said inner shell and said outer shell.

4. A bottle holder device as set forth in claim 3, wherein said inner shell and said outer shell are secured together in an air tight manner such that gas trapped in said interstitial space contributes to said thermal insulator characteristics of said body.

5. A bottle holder device as set forth in claim 3, wherein said base portion of said body is removable to provide access to said interstitial space.

6. A bottle holder device as set forth in claim 2, wherein an upper portion of said inner shell defines a stop flange at which said inner shell and outer shell are secured together and an attachment area at which said lid is connected to said body.

7. A bottle holder device as set forth in claim 6, wherein said attachment area of said inner shell defines outer threads for engaging inner threads defined in said lid.

8. A bottle holder device as set forth in claim 1, wherein said base portion of said body is removable so that an interstitial space of said cylindrical portion can be accessed.

9. A bottle holder device as set forth in claim 1, wherein said lid has a generally frustoconical configuration.

10. A bottle holder device as set forth in claim 1, wherein an outer surface of said body has surface features to facilitate gripping by a user.

11. A bottle holder device as set forth in claim 10, wherein said surface features comprise at least two vertical gripping channels extending along an outer surface.

12. A bottle holder device as set forth in claim 1, wherein a circular depression is located at said base of said body for receipt of said bottle when it has a smaller diameter, said bottle being seated on a rim of said depression when it has a larger diameter.

13. A bottle holder device as set forth in claim 12, wherein said circular depression is an integral formation defined in said body.

14. A bottle holder device as set forth in claim 12, wherein said circular depression is defined in a compressible disc member located in said interior cavity.

15. A bottle holder device as set forth in claim 1, wherein said lower portion of said lid slides along an outer surface of said body to accommodate a height of said bottle.

16. A bottle holder device as set forth in claim 1, wherein said attachment portion is attached to said lid via a press-fit arrangement.

17. A bottle holder device as set forth in claim 16, wherein said press-fit arrangement comprises at least one integral protrusion carried by said lid extending into a corresponding receptor defined in said attachment portion of said seal.

18. A bottle holder device as set forth in claim 17, wherein said at least one integral protrusion comprises first and second concentric rings received in corresponding slots in said attachment portion of said seal.

19. A bottle holder device as set forth 1, wherein said body defines outer threads for engaging inner threads defined in said lid.

20. A bottle holder device as set forth in claim 1, wherein said engaging portion of said seal engages an underside of said lid as liquid is poured from said bottle.

21. A method for containing a beverage bottle in a manner inhibiting temperature change during a period of time in which contents of said bottle are consumed, said method comprising steps of:
   providing a bottle holder having:
      a body having a base portion and a generally cylindrical portion for receipt of said bottle;
      said body configured to have thermal insulator characteristics which inhibit temperature change of said bottle;
      a lid having a lower portion adapted to removably engage said body and an upper portion, said body and said lid together defining an interior cavity for containing said bottle;
      said lid defining an aperture through which said neck of said bottle will extend to allow said contents of said bottle to be poured; and
      a seal carried by said lid and being formed of compressible material, said seal having an attachment portion attached to said lid and a flexible web portion connecting said attachment portion and an engaging portion, said engaging portion being widened so as to contact said neck of said bottle adjacent said aperture to accommodate and maintain different sizes of said bottle;
   wherein said attachment portion, said web portion, and said engaging portion of said seal form a generally U-shaped configuration with said web portion being at the bottom of said U-shaped configuration and thereby providing an air gap between said attachment portion and said engaging portion, said web portion of said seal being spaced apart from an inner surface of said lid toward said base portion of said body such that said engaging portion may deflect into the air gap as said neck is received through the aperture of the lid to accommodate said bottle, an upper portion of said engaging portion of said seal being curved outward;

placing said bottle in said body of said bottle holder;

attaching said lid to said bottle holder such that said neck of said bottle extends through said aperture; and pouring at least some of said contents of said bottle.

22. A method as set forth in claim 21, wherein said engaging portion of said seal engages an underside of said lid as liquid is poured from said bottle.

* * * * *

UNITED STATES PATENT AND TRADEMARK OFFICE
CERTIFICATE OF CORRECTION

PATENT NO. : 10,427,858 B2  
APPLICATION NO. : 15/317439  
DATED : October 1, 2019  
INVENTOR(S) : Ian Frank Mackintosh and Celia Beth Mackintosh Page 1 of 1

It is certified that error appears in the above-identified patent and that said Letters Patent is hereby corrected as shown below:

On the Title Page

Underneath the References Cited Section, please insert the following under 1,999,670 A * 4/1935 Strouse (Continued):
-- FOREIGN PATENT DOCUMENTS
WO2004/045961 A2 3/2004 --

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*